United States Patent
Sidaraddi et al.

(10) Patent No.: US 10,567,223 B1
(45) Date of Patent: Feb. 18, 2020

(54) OPTIMISTIC CONCURRENCY CONTROL FOR MANAGED NETWORK DEVICES

(71) Applicant: Juniper Networks, Inc., Sunnyvale, CA (US)

(72) Inventors: Prakash Ninganagouda Sidaraddi, Bangalore (IN); Halan Prakash, Bangalore (IN); Rosh PR, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 325 days.

(21) Appl. No.: 15/452,417

(22) Filed: Mar. 7, 2017

(51) Int. Cl.
*H04L 12/24* (2006.01)

(52) U.S. Cl.
CPC .................. *H04L 41/0813* (2013.01)

(58) Field of Classification Search
CPC ............... H04L 41/0813; H04L 41/082; H04L 41/0823; H04L 41/0826; H04L 41/083; H04L 41/0833; H04L 41/0836
See application file for complete search history.

(56) References Cited

U.S. PATENT DOCUMENTS

| | | | | |
|---|---|---|---|---|
| 6,012,100 A * | 1/2000 | Frailong | ............... | H04L 41/082 709/220 |
| 6,230,194 B1 * | 5/2001 | Frailong | ............... | H04L 41/082 709/220 |
| 6,615,038 B1 * | 9/2003 | Moles | ............... | H04M 3/22 455/418 |
| 7,555,569 B1 * | 6/2009 | O'Hare | ............... | G06F 3/0611 707/999.2 |
| 7,804,832 B2 * | 9/2010 | Andrews | ............... | H04L 12/4675 370/390 |
| 8,583,769 B1 * | 11/2013 | Peters | ............... | G06F 9/541 709/221 |
| 8,593,172 B1 * | 11/2013 | Jenkins, IV | ............... | H03K 19/177 326/38 |
| 8,949,305 B1 * | 2/2015 | White | ............... | G06F 11/0709 709/203 |
| 10,275,282 B1 * | 4/2019 | Brandwine | ............... | G06F 8/65 |

(Continued)

FOREIGN PATENT DOCUMENTS

CA     2594052 A1 * 11/2007 ............ G06F 9/4411

OTHER PUBLICATIONS

Enns, et al., "Network Configuration Protocol," Internet Engineering Task Force, RFC 6241, Jun. 2011, 113 pp.

(Continued)

*Primary Examiner* — Kostas J Katsikis
(74) *Attorney, Agent, or Firm* — Shumaker & Sieffert, P.A.

(57) ABSTRACT

An example network device includes a memory storing a configuration database including current configuration data having a current revision value, and one or more processors implemented in digital logic circuitry and configured to receive configuration data for the network device, the configuration data including an expected current revision value, determine an actual current revision value of current configuration data for the network device, determine whether the expected current revision value is equal to the actual current revision value, and send an error message in response to determining that the expected current revision value is not equal to the actual current revision value.

17 Claims, 4 Drawing Sheets

(56) References Cited

U.S. PATENT DOCUMENTS

| | | | |
|---|---|---|---|
| 10,355,927 B2* | 7/2019 | Lihosit | H04L 41/082 |
| 10,374,886 B1* | 8/2019 | A | H04L 41/12 |
| 2003/0041138 A1* | 2/2003 | Kampe | H04L 41/0893 |
| | | | 709/223 |
| 2005/0114240 A1* | 5/2005 | Watson-Luke | G06F 9/44505 |
| | | | 705/34 |
| 2005/0114692 A1* | 5/2005 | Watson-Luke | G06Q 20/367 |
| | | | 726/26 |
| 2006/0050862 A1* | 3/2006 | Shen | H04L 12/2856 |
| | | | 379/219 |
| 2006/0059253 A1* | 3/2006 | Goodman | G06Q 10/10 |
| | | | 709/223 |
| 2006/0168173 A1* | 7/2006 | Clemm | H04L 41/046 |
| | | | 709/223 |
| 2008/0109568 A1* | 5/2008 | Rengarajan | H04L 41/085 |
| | | | 710/19 |
| 2010/0001902 A1* | 1/2010 | Smith | G01S 5/0027 |
| | | | 342/357.48 |
| 2011/0103229 A1* | 5/2011 | Fidler | H04L 41/0681 |
| | | | 370/241 |
| 2012/0147733 A1* | 6/2012 | Wang | H04L 41/0863 |
| | | | 370/216 |
| 2012/0252406 A1* | 10/2012 | Martin | H04L 63/205 |
| | | | 455/410 |
| 2014/0006951 A1* | 1/2014 | Hunter | H04H 60/31 |
| | | | 715/719 |
| 2014/0031025 A1* | 1/2014 | Martin | H04W 12/08 |
| | | | 455/418 |
| 2014/0215028 A1* | 7/2014 | Donner | H04L 41/16 |
| | | | 709/220 |
| 2014/0258479 A1* | 9/2014 | Tenginakai | H04L 41/082 |
| | | | 709/220 |
| 2014/0281102 A1* | 9/2014 | Feldman | G06F 13/1642 |
| | | | 710/310 |
| 2015/0032867 A1* | 1/2015 | Lihosit | H04L 41/082 |
| | | | 709/221 |
| 2015/0379226 A1* | 12/2015 | Morinaga | G16H 50/30 |
| | | | 705/2 |
| 2016/0246582 A1* | 8/2016 | Benton | G06F 8/61 |
| 2017/0005861 A1* | 1/2017 | Strandzhev | H04L 41/0813 |
| 2017/0053219 A1* | 2/2017 | Wright | G06Q 10/0633 |
| 2017/0075677 A1* | 3/2017 | Gross | G01R 31/44 |
| 2017/0078158 A1* | 3/2017 | Dec | G06F 11/30 |
| 2017/0201598 A1* | 7/2017 | Floyd | H04L 67/141 |
| 2017/0255244 A1* | 9/2017 | Neilson | G06F 1/28 |
| 2017/0285982 A1* | 10/2017 | DeArment | G06F 3/0619 |
| 2017/0289804 A1* | 10/2017 | Kovacevic | G06F 21/575 |
| 2017/0310546 A1* | 10/2017 | Nair | H04L 41/22 |
| 2018/0088928 A1* | 3/2018 | Smith | H04L 67/34 |
| 2018/0270108 A1* | 9/2018 | Negm | H04L 41/0813 |

OTHER PUBLICATIONS

Enterasys, et al., "An Architecture for Describing Simple Network Management Protocol (SNMP) Management Frameworks," Network Working Group, RFC 3411, Dec. 2002, 75 pp.

Enns, "NETCONF Configuration Protocol," Network Working Group, RFC 4741, Dec. 2006, 95 pp.

Bjorklund, "YANG—A Data Modeling Language for the Network Configuration Protocol (NETCONF)," Internet Engineering Task Force, RFC 6020, Oct. 2010, 173 pp.

U.S. Appl. No. 15/198,657, filed by Tong Jiang et al., filed Jun. 30, 2016.

U.S. Appl. No. 15/396,300, filed by Chandrasekhar et al., filed Dec. 30, 2016.

* cited by examiner

_(1)_
OPTIMISTIC CONCURRENCY CONTROL FOR MANAGED NETWORK DEVICES

TECHNICAL FIELD

This disclosure relates to computer networks, and more particularly, to configuring devices within computer networks.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network services often require configuration of multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network Management (NM) Systems may support these services such that an administrator can easily create and manage these high level network services. In most of the network service provider deployments, the number of deployed connectivity services are in thousands to millions. When the services are changed, the NM System typically deploys configuration changes throughout the network. In some cases, there may be concurrent changes across the devices within the network, as multiple administrators or management systems may attempt to modify the network services in parallel.

NMS devices in a network typically configure multiple devices in the network to perform coordinated end-to-end services. To keep the devices functional for a service and to avoid disruption of existing services, transactional semantics may be used. Transaction semantics are required when the same device configuration is altered in a concurrent manner. Examples of concurrent configuration cases include: more than one NMS device managing configuration of the same managed device; manual configuration changes by a human operator directly on the device while the device is being managed by a NMS (sometimes referred to as an out-of-band (OOB) configuration change); and a single management system concurrently enabling multiple services on the same device.

One option to overcome concurrency issues by transactional means is to lock all the device configuration databases upfront (as explained in RFC 6241), and then commit the configuration to each of the devices sequentially. Based on the outcome of individual commits, an NMS device can choose to roll back the configurations of previously configured network devices. After all devices have been reconfigured, the NMS device may unlock the reconfigured devices.

SUMMARY

In general, this disclosure describes optimistic concurrency control techniques that may be performed by a managed network device to increase network configuration concurrency across large sets of network devices involved in providing large-scale network services. As described herein, the optimistic concurrency control techniques aid individual network devices in determining whether to accept or reject received configuration data and reduce situations leading to inconsistencies in configuration of network services in large-scale networks. This disclosure recognizes that, at times, network services spanning a network involve large set of devices. Some examples of such services include, but are not limited to, layer 3 (L3) multi-protocol label switching (MPLS) virtual private network (VPN), virtual private LAN service (VPLS), and peer-to-peer (P2P) Hub and Spoke. If the number of devices involved in the transaction is large, time taken to configure all the devices increases. Even if a configuration change is initiated in a concurrent fashion by multiple systems or users, the time for which a lock is required by conventional approaches often depends on the slowest responding device or the speed and logic of a configuration management application. As such, these approaches have the effect of reducing the concurrency of configuration data for the network as a whole. That is, certain managed network devices may be configured differently than other managed network devices for an extended period of time. Due to this, prolonged configuration database locks typically used by conventional systems and devices may negatively impact performance in the ability of a configuration application to concurrently configure multiple services on the set of devices in the network.

The techniques of this disclosure may be used to mitigate these issues by allowing managed network devices to support optimistic configuration commits. This may allow a managed network device to only be locked only while updating configuration data of the managed network device, thereby reducing the period of the lock for the individual managed device. The managed network device, according to the techniques of this disclosure, is tasked with determining whether to accept or reject received configuration data. A user (e.g., an administrator) of a network management system (NMS) device who produces an update to configuration data may be working on the assumption that each of the managed network devices has the same existing configuration data revision (e.g., revision 'X'). Thus, the user may specify the expected current configuration data revision 'X' as being associated with configuration update data. The managed network device, according to the techniques of this disclosure, compares the expected current configuration data revision for received configuration data with the actual current configuration data revision value for the current configuration data. If the expected current configuration data revision value matches the actual current configuration data revision value, the managed network device accepts the configuration data, otherwise the managed network device rejects the configuration data and sends an error to the NMS device.

In one example, a method of configuring a network device includes receiving, by a processor of a network device implemented in digital logic circuitry, configuration data for the network device, the configuration data including an expected current revision value, determining, by the processor, an actual current revision value of current configuration data for the network device, determining, by the processor, whether the expected current revision value is equal to the actual current revision value, and sending, by the processor, an error message in response to determining that the expected current revision value is not equal to the actual current revision value.

In another example, a network device includes a memory storing a configuration database including current configuration data having a current revision value, and one or more processors implemented in digital logic circuitry and configured to: receive configuration data for the network device, the configuration data including an expected current revision value, determine an actual current revision value of current configuration data for the network device, determine whether the expected current revision value is equal to the actual current revision value, and send an error message in response to determining that the expected current revision value is not equal to the actual current revision value.

In another example, a system includes a network management system (NMS) device, and a network device. The network device comprises a memory storing a configuration database including current configuration data having a current revision value, and one or more processors implemented in digital logic circuitry and configured to receive, from the NMS device, configuration data for the network device, the configuration data including an expected current revision value, determine an actual current revision value of current configuration data for the network device, determine whether the expected current revision value is equal to the actual current revision value, and send an error message to the NMS device in response to determining that the expected current revision value is not equal to the actual current revision value.

In another example, a non-transitory computer-readable medium has stored thereon instructions that, when executed, cause a processor of a network device to receive configuration data for the network device, the configuration data including an expected current revision value, determine an actual current revision value of current configuration data for the network device, determine whether the expected current revision value is equal to the actual current revision value, and send an error message in response to determining that the expected current revision value is not equal to the actual current revision value.

In another example, a method includes receiving, by a processor of a network management system (NMS) device implemented in digital logic circuitry, configuration data for a plurality of managed network devices, determining, by the processor, an expected current revision value of current configuration data deployed to the managed network devices, and sending, by the processor, the configuration data and the expected current revision value to the plurality of managed network devices.

The details of one or more examples are set forth in the accompanying drawings and the description below. Other features, objects, and advantages of the techniques of this disclosure will be apparent from the description and drawings, and from the claims.

DETAILED DESCRIPTION

Figure 1:
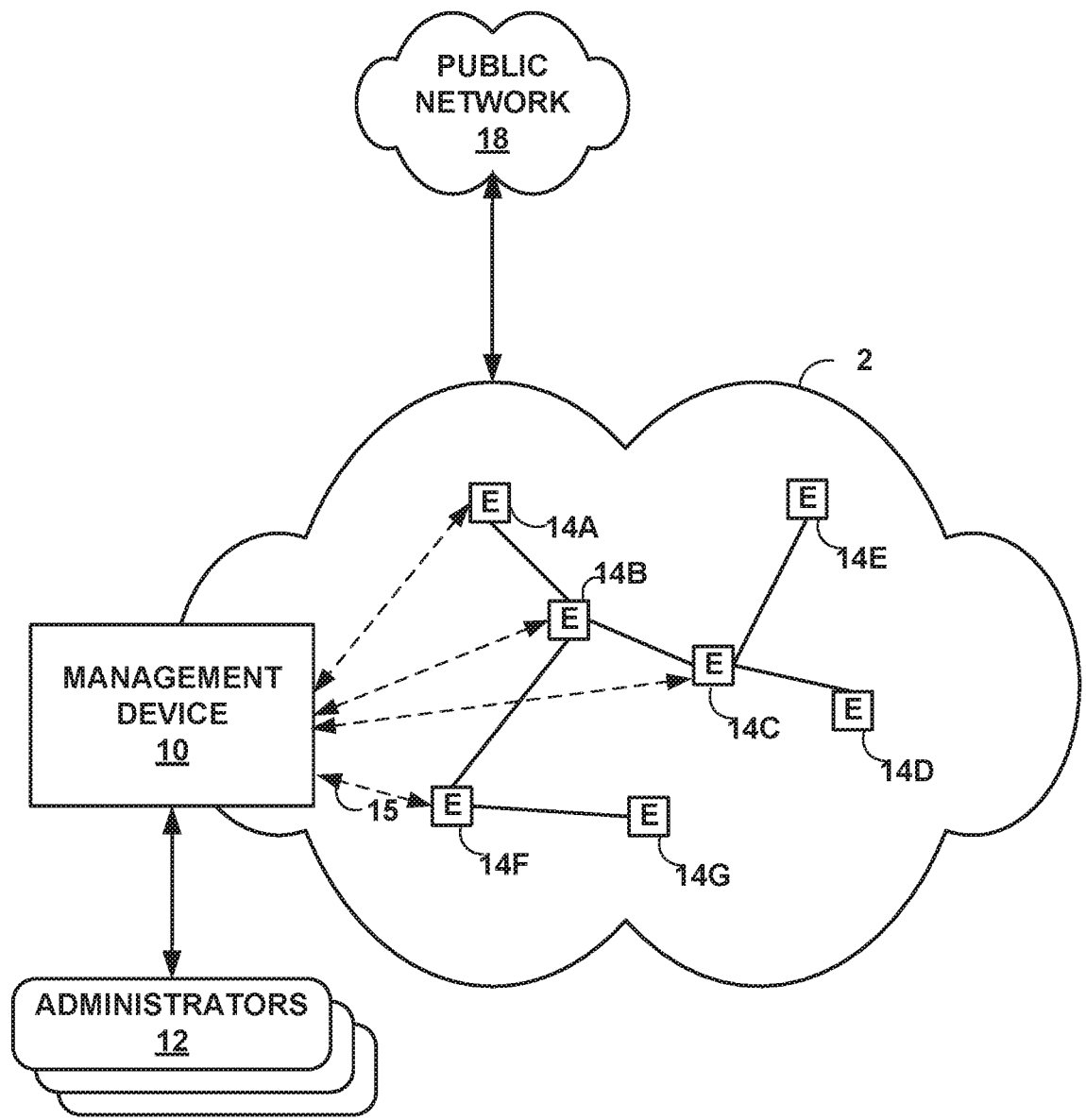
FIG. 1 is a block diagram illustrating an example including elements of an enterprise network that are managed using a management device.

FIG. 1 is a block diagram illustrating an example including elements of an enterprise network 2 that are managed using one or more management devices 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (DP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Management devices 10 are communicatively coupled to elements 14 via enterprise network 2. Management devices 10, in some examples, form part of a device management system. Management devices 10 may be coupled either directly or indirectly to the various elements 14. Once elements 14 are deployed and activated, administrators 12 uses management devices 10 to manage the network devices using a device management protocol. One example device protocol is the Simple Network Management Protocol (SNMP) that allows management devices 10 to traverse and modify management information bases (MIBs) that store configuration data within each of managed elements 14. Further details of the SNMP protocol can be found in Harrington et al., RFC 3411. "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In common practice, management devices 10, also referred to as network management system (NMS) or NMS devices, and elements 14 are centrally maintained by an 11T group of the enterprise. Administrators 12 interacts with management devices 10 to remotely monitor and configure elements 14. For example, administrators 12 may receive alerts from management devices 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrators 12 uses management devices 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using management devices 10, to directly configure element 14F. In this manner, a user can provide commands in a format for execution directly to elements 14.

Further, administrators 12 can also create scripts that can be submitted by management devices 10 to any or all of elements 14. For example, in addition to a CLI interface, elements 14 also provide interfaces for receiving scripts that specify the commands in accordance with a scripting language. In a sense, the scripts may be output by management devices 10 to automatically invoke corresponding remote procedure calls (RPCs) on the managed elements 14. The scripts may conform to, e.g., extensible markup language (XML) or another data description language.

Administrators 12 uses management devices 10 to configure elements 14 to specify certain operational characteristics that further the objectives of administrators 12. For example, administrators 12 may specify for an element 14 a particular operational policy, regarding security, device accessibility, traffic engineering, quality of service (QoS), network address translation (NAT), packet filtering, packet forwarding, rate limiting, or other policies. Management devices 10 use one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language Mill)-based data encoding for configuration data, which may include policy data. NETCONF is described in Enns, "NETCONF Configuration Protocol," Network Working Group, RFC 4741, December 2006, available at tools.ietf.org/html/rfc4741. Management devices 10 may establish NETCONF sessions with one or more of elements 14.

Management devices 10 may be configured to compare a new set of high-level configuration data to an existing (or old) set of high-level configuration data to determine differences between the new set of high-level configuration data nd the old set of high-level configuration data. Management devices 10 then apply corresponding translation functions to the differences between the new and old high-level configuration data. In particular, management device 10 determine whether the new set of configuration data includes any additional configuration data elements relative to the old set of high-level configuration data, whether the new set of configuration data modifies any configuration data elements relative to the old set of high-level configuration data, and/or whether the new set of configuration data omits any configuration data elements that were included in the old set of high-level configuration data. In some examples, management devices 10 include a first set of translation functions for translating additional or modified configuration data elements, and a second set of translation functions for translating deleted configuration data elements. Thus, management devices 10 execute the appropriate translation function for the additional, modified, or deleted configuration data elements.

Either or both of high-level configuration data and low-level configuration data may be expressed in YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020. Management devices 10 include one or more translation functions for translating high-level configuration data to low-level (i.e., device-level) configuration data. These functions are configured accept the high-level configuration data (which may be expressed as structured input parameters, e.g., according to YANG). The functions are also configured to output respective sets of low-level device configuration data changes, e.g., device configuration additions, updates, and deletions. Additional details regarding an example process for translating high-level configuration information to low-level device configuration information are described in, e.g., Jiang et al, "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference. After translating high-level configuration changes to low-level configuration changes, management devices 10 send the low-level configuration changes to elements 14.

In general, any or all of administrators 12 may create configuration changes that are to be sent to elements 14. Thus, if a first one of administrators 12 and a second one of administrators 12 create configuration changes in parallel, the changes may conflict with one another. In particular, the first and second ones of administrators 12 may assume that the current configuration data is current for their respective configuration changes. However, if the configuration change from the first one of administrators 12 reaches elements 14 before the configuration change from the second one of administrators 12, the configuration change from the second one of administrators 12 will incorrectly be based on a different starting configuration. Administrators 12 may change configuration of elements 14 using the same or different respective NMS devices (e.g., one or more management devices 10) and/or locally applying out-of-band (OOB) changes to one or more of elements 14 using an interface presented by those elements. The techniques of this disclosure may be applied to detect and mitigate such scenarios in which the expected current configuration data is not in fact the actual current configuration data for one or more of elements 14.

In general, elements 14 support optimistic configuration commits, in accordance with the techniques of this disclosure. Elements 14 are configured to track configuration state using a revision value (e.g., a revision number for most recently received configuration data and/or a timestamp value corresponding to a time at which the most recent configuration data was received).

Suppose, for example, that V0 is the revision value at time T0, and V1 is the revision value at time T1. The following conditions should hold true:

If T0<T1 and V0!=V1, then V0<V1 should hold true
If T0=T1, then V0=V1 should hold true As noted above, one or more of management devices 10 typically sends updates to existing configuration data to elements 14, rather than entirely new configuration data. Such updates include revision values, and administrators 12 construct the updates relative to existing configuration data for elements 14. Thus, if the actual current configuration data of one or more of elements 14 does not match the expected current configuration data as assumed by administrators 12, a commit of the new configuration data should be expected to fail. As such, elements 14 are configured to generate an error message and send the error message to management devices 10 when an expected current revision value for the new configuration data does not match an actual current revision value. Moreover, elements 14 may be configured to compare revision values and perform a configuration commit as an atomic operation.

In case the commit fails due to configuration revision mismatch, management devices 10 (at the direction of one or more of administrators 12) can re-generate the configuration data applicable to new device configuration revision or roll back the configuration on other elements 14 that were successfully updated to achieve distributed transactional semantics. An example approach to generate rollback/undo configuration on successfully configured elements 14 to achieve distributed transactional semantics is discussed in, e.g., Chandrasekhar et al., "RESOLVING OUT-OF-BAND CONFIGURATION CHANGES TO LOW-LEVEL CONFIGURATION FOR MANAGED NETWORK DEVICES," U.S. application Ser. No. 15/396,300, filed Dec. 30, 2016, the entire contents of which are hereby incorporated by reference.

This optimistic concurrency control approach may reduce the amount of time configuration of elements 14 will be locked in a distributed transaction, and may also promote simultaneous configuration changes in the network. This is a major advantage over other techniques that use network-wide configuration locks, That is, each individual one of elements 14 need only be locked during an update transaction for a time period needed to perform a local update. The entire set of elements 14 need not be simultaneously locked network-wide, contrary to conventional network management systems.

Elements 14 may be configured to perform configuration validation techniques of this disclosure according to the pseudocode shown below:

Lock the configuration DB.
If validation failed:
Unlock configuration DB and send error
if input_config_revision equals device_config_revision:
Commit input_config to device_config
Unlock configuration DB and send success
else
Unlock and send error In this example, one of elements 14 (e.g., element 14A) initially receives an update to a configuration database (DB). Accordingly, element 14A locks its local version of the configuration database. Element 14A then determines whether the configuration update is valid. If the validation fails, element 14A unlocks the configuration database and sends an error, e.g., to the one of management devices 10 from which element 14A received the configuration update. Otherwise, if the validation is successful, element 14A determines whether the input expected configuration revision is equal to the actual current configuration revision. If the input expected configuration revision is equal to the actual current configuration revision, element 14A commits the input configuration data update to the configuration database, otherwise, element 14A unlocks the configuration database and sends an error to the one of management devices 10 from which element 14A received the configuration update.

An example Netconf snippet that management devices 10 may use to send a revision value to elements 14 is shown below:

<rpc message-id="101"xmlns="urn:ietf:params:xml:ns:netconf:base:1.0"> <commit onRevision="10">
</rpc>

In this example, "onRevision='10'" represents the expected current configuration data revision value on elements 14 before applying this commit. Thus, elements 14 may compare the value of the "onRevision" element to the actual current configuration data revision value, and if the values match, apply the configuration update, otherwise send an error to management devices 10. A similar construct can be added to NETCONF specification to standardize the techniques of this disclosure.

Figure 2:
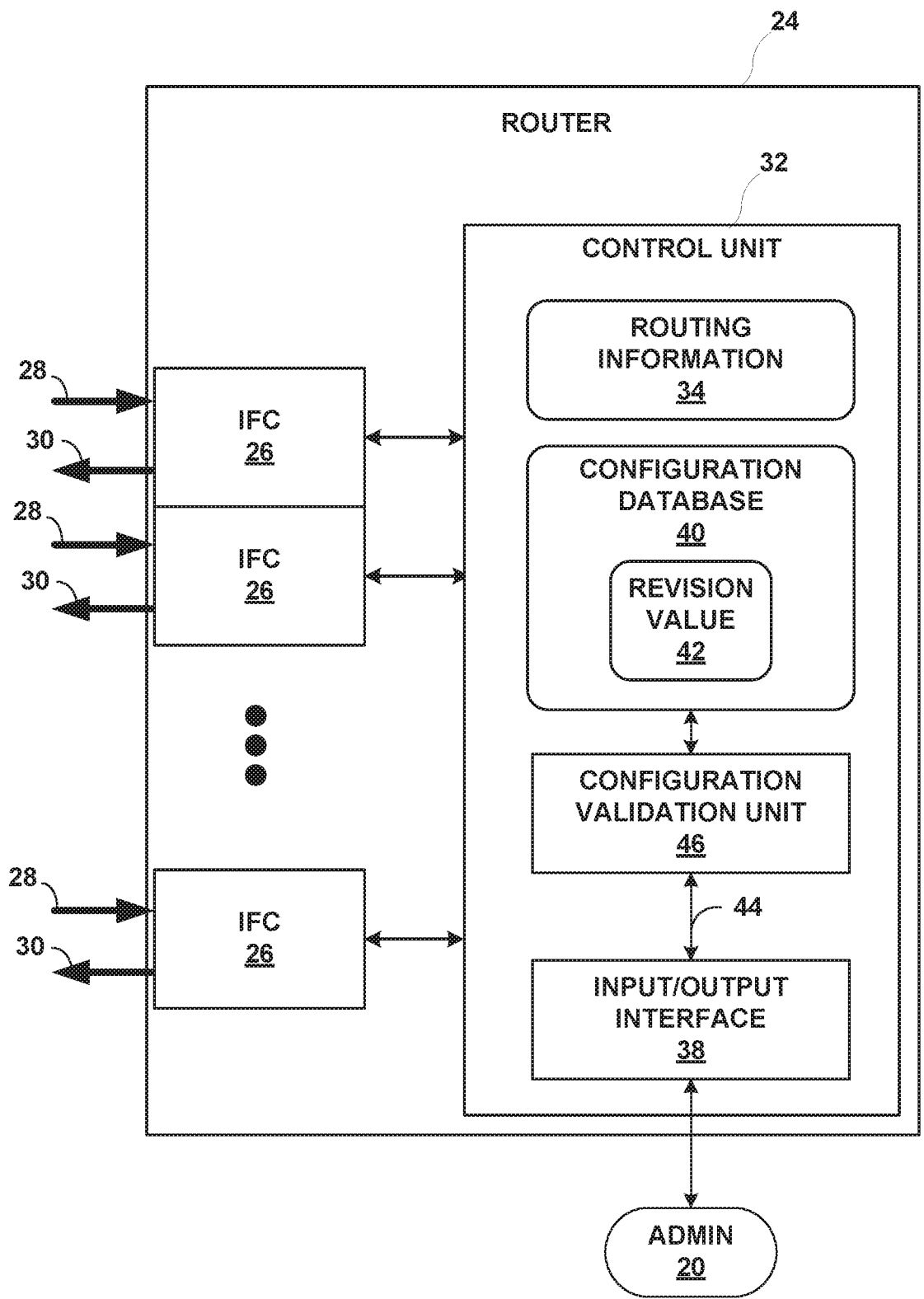
FIG. 2 is a block diagram illustrating an example network router that receives configuration data and applies optimistic concurrency control to determine whether to accept or reject the configuration data in accordance with the techniques of this disclosure.

FIG. 2 is a block diagram illustrating an example network router 24 that receives configuration data and determines whether to accept or reject the configuration data in accordance with the techniques of this disclosure. As such, router 24 represents an example of one of elements 14 of FIG. 1. Any or all of elements 14 may be configured in a manner similar to router 24 of FIG. 2, In this example, router 24 includes a set of one or more interface cards (IFCs) 26 that receive and send packets via network links 28 and 30, respectively. IFCs 26 are typically coupled to network links 28, 30 via one or more interface ports.

Router 24 further comprises a control unit 32 that maintains routing information 34. In general, control unit 32, and the components thereof, operate in the "control plane" of router 24. As discussed in greater detail below, the control plane of a router generally includes processing units for configuring lower level components, such as those operating in the "forwarding plane," such as IFCs 26. Although not shown in FIG. 2, the forwarding plane generally includes forwarding information, such as a "forwarding information base" or "FIB."

Routing information 34 describes the topology of network 12 and, in particular, routes through network 12. Routing information 34 may include, for example, route data that describes various routes within network 12, and corresponding next hop data indicating appropriate neighboring devices within network 12 for each of the routes. Routing information 34 is periodically updated to accurately reflect the topology of network 12. Routing information 34 may also be referred to as a "routing information base" or "RIB." In general, control unit 32 programs the forwarding plane (e.g., the FIB) based on routes of routing information 34, such that when router 24 receives a packet via inbound network link 28, a forwarding engine (not shown in FIG. 2) determines the destination address of the packet using the FIB and outputs the packet on an outbound network link 30 based on the destination.

Control unit 32 may receive configuration input from administrators 12 via an input/output (I/O) interface 38. I/O interface 38 generally allows administrators 12 to submit an electronic document (e.g., a file) including high level configuration information to router 24. Additionally or alternatively, administrators 12 may use a NMS device, such as management devices 10 of FIG. 1, to send configuration information to router 24 via one of IFCs 26. Control unit 32 also includes configuration database 40, including actual current revision value 42.

Control unit 32 further includes configuration validation unit 46. In some examples, configuration translation unit 46 may correspond to a management daemon (MGD) of control unit 32. In accordance with the techniques of this disclosure, in response to receiving configuration update data 44, configuration validation unit 46 validates configuration update data 44 using an expected current revision value of configuration update data 44 and actual current revision value 42. That is, the expected current revision value specifies an expected current revision value for configuration database 40 of router 24. The expected current revision value is the revision of configuration database 40 that one of administrators 12 assumed to be current for router 24 when creating a configuration data update. Moreover, in response to receiving configuration information, control unit 32 may lock configuration database 40, determine whether to update configuration database 40 using configuration validation unit 46, then either update configuration database 40 or send an error message (unlocking configuration database 40 after either updating configuration database 40 or sending the error message).

Accordingly, configuration validation unit 46 compares revision value 42 (that is, an actual current revision value) with an expected current revision value associated with configuration update data 44. If actual current revision value 42 matches the expected current revision value associated with configuration update data 44, configuration validation unit 46 validates configuration update data 44. In response, control unit 32 updates configuration database 40 with configuration update data 44. That is, if configuration update data 44 specifies added elements, control unit 32 adds the added elements to configuration database 40. If configuration update data 44 specifies modifications to existing elements, control unit 32 modifies the existing elements of configuration database 40. If configuration update data 44 specifies existing elements to be deleted, control unit 32 deletes the specified elements from configuration database 40. Control unit 32 also updates revision value 42 to reflect a current revision value based on configuration update data 44.

On the other hand, if actual current revision value 42 does not match the expected current revision value associated with configuration update data 44, configuration validation unit 46 determines that configuration update data 44 is not valid. In response, control unit 32 sends an error message to the NMS device (e.g., management devices 10 of FIG. 1) from which configuration update data 44 was received. The error message may simply indicate that configuration database 40 has not been updated. Alternatively, control unit 32 may additionally specify actual current revision value 42 in the error message.

Figure 3:
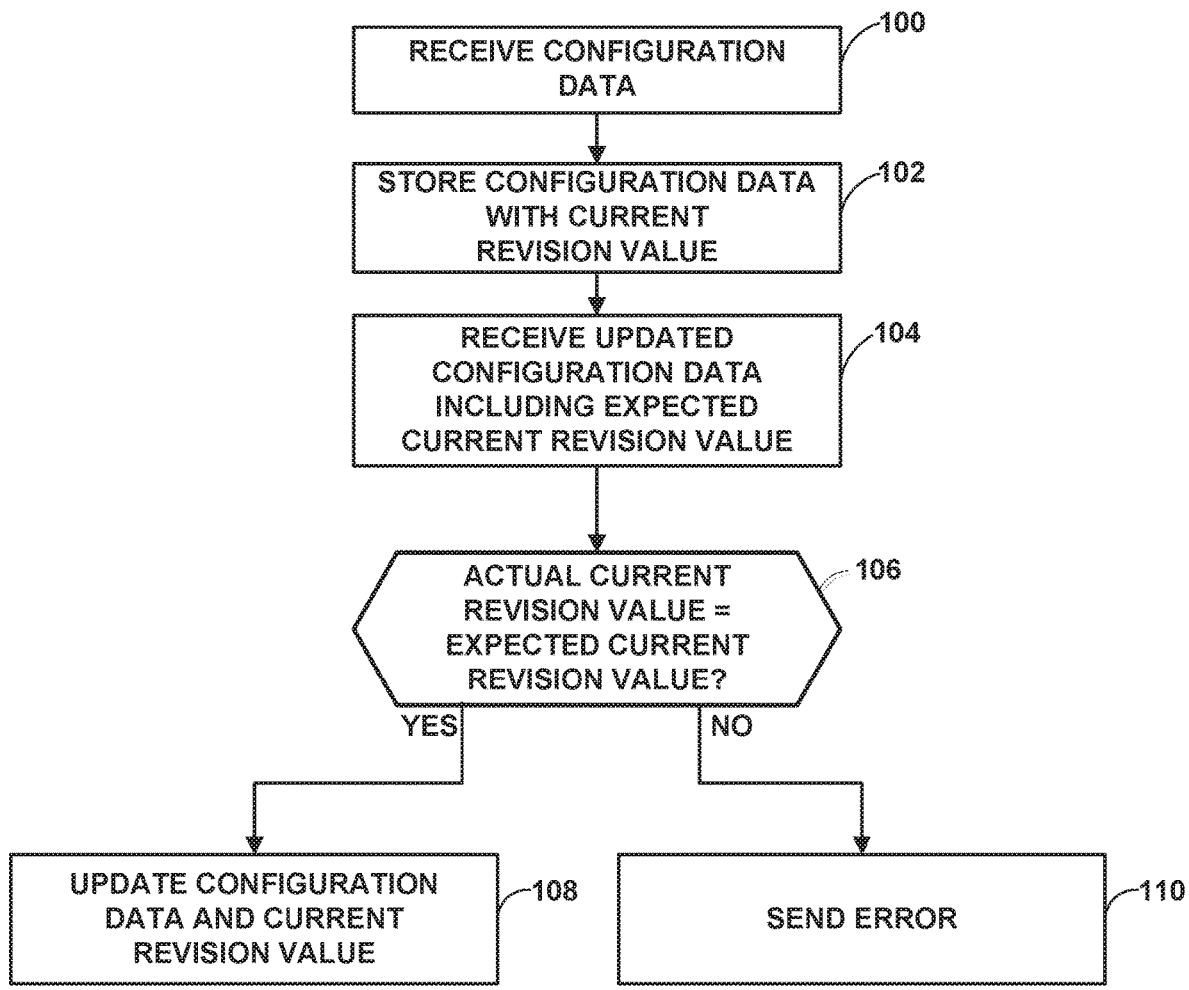
FIG. 3 is a flowchart illustrating an example method of configuring and reconfiguring a router in accordance with techniques of this disclosure.

FIG. 3 is a flowchart illustrating an example method of configuring and reconfiguring router 24 in accordance with techniques of this disclosure. The method of FIG. 3 is explained with respect to router 24 of FIG. 2. However, it should be understood that other devices may be configured to perform this or a similar method.

In this example, initially, router 24 receives an initial (or current) set of configuration data (100). Router 24 may receive the configuration data from a NMS device, such as management devices 10 of FIG. 1, or directly from an administrator via, e.g., input/output interface 38. Control unit 32 stores the configuration data and a current revision value in configuration database 40 (102). In particular, control unit 32 stores the current revision value as revision value 42 (FIG. 2). Furthermore, control unit 32 may lock configuration database 40 prior to storing the configuration data and the current revision value to configuration database 40, and then unlock configuration database 40. In this example, the current revision value represents a current revision for configuration database 40.

Subsequently, router 24 receives updated configuration data including an expected current revision value (104). Again, router 24 may receive the updated configuration data from a NMS device, such as one of management devices 10 of FIG. 1, or directly from an administrator via, e.g., input/output interface 38. Initially, control unit 32 may lock configuration database 40 in response to receiving the updated configuration data. Configuration validation unit 46 compares the expected current revision value to the actual current revision value (i.e., revision value 42) stored in configuration database 40 (106).

If configuration validation unit 46 determines that the expected current revision value is equal to the actual current revision value ("YES" branch of 106), control unit 32 updates the configuration data of configuration database 40, including the value of revision value 42 (108). That is, control unit 32 commits the received updated configuration data to configuration database 40, which may be an atomic operation with step 106 to prevent interruption by another configuration data update. However, if configuration validation unit 46 determines that the expected current revision value is not equal to the actual current revision value ("NO" branch of 106), control unit 32 sends an error message (110), e.g., to a NMS device from which the updated configuration data was received. If control unit 32 locked configuration database 40 as discussed above, control unit 32 unlocks configuration database 40 after either updating configuration database 40 or sending the error message.

Figure 4:
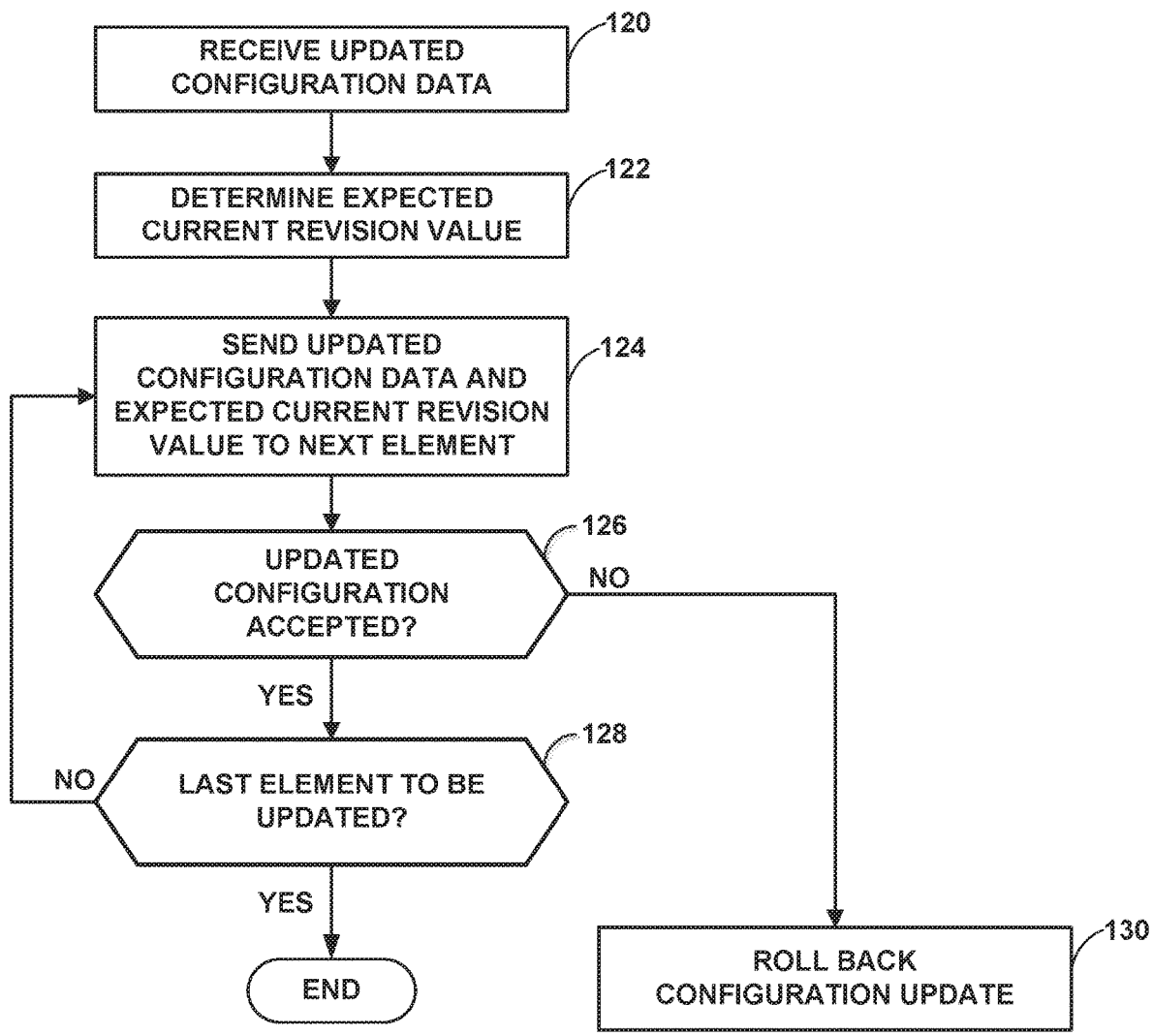
FIG. 4 is a flowchart illustrating an example method performed by one or more management devices to deploy a configuration update in accordance with the techniques of this disclosure.

FIG. 4 is a flowchart illustrating an example method performed by one or more of management devices 10 to deploy a configuration update in accordance with the techniques of this disclosure. Initially, one or more of management devices 10 receives updated configuration data (120), e.g., from one or more of administrators 12 (FIG. 1). Management devices 10 then determine an expected current revision value (122), e.g., based on a most recent configuration data update deployed to elements 14. Management devices 10 then send updated configuration data and the expected current revision value to a next managed device, e.g., one of elements 14 (124).

Management devices 10 then determine whether the sent updated configuration information was accepted (126). If the updated configuration data was accepted ("YES" branch of 126), management devices 10 determine whether the last one of elements 14 to be updated has been updated (128). If additional elements 14 remain to be updated ("NO" branch of 128), management devices 10 continue sending updated configuration data and the expected current revision value to the next one of elements 14 (124). Otherwise, once all of elements 14 have been updated ("YES" branch of 128), the process ends.

However, if one of management devices 10 receives an error from one of elements 14 indicating that the updated configuration was not accepted ("NO" branch of 126), management devices 10 may roll back the configuration update (130), to revert configuration data of elements 14 to a previous state. For example, management devices 10 may send new instructions to remove the recently committed configuration data from respective configuration databases of elements 14 that accepted the updated configuration data. Alternatively, management devices 10 may send specific updated configuration data to the one of elements 14 that rejected the recent configuration data update that accounts for the actual current version of configuration data for the one of elements 14.

The techniques described in this disclosure may be implemented in hardware, software, firmware or any combination thereof. For example, various aspects of the techniques may be implemented within one or more microprocessors, digital signal processors (DSPs), application specific integrated circuits (ASICs), field programmable gate arrays (FPGAs), or any other equivalent integrated or discrete logic circuitry, as well as any, combinations of such components. The term "processor" or "processing circuitry" may, generally refer to any of the foregoing logic circuitry, alone or in combination with other logic circuitry, or any other equivalent circuitry.

When implemented in software, the functionality ascribed to the systems and devices described in this disclosure may be embodied as instructions on a computer-readable medium such as random access memory (RAM), read-only memory (ROM), non-volatile random access memory (NVRAM), electrically erasable programmable read-only memory (EEPROM), FLASH memory, magnetic media, optical media, or the like. The instructions are executed to support one or more aspects of the functionality described in this disclosure The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only, memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method of configuring a network device, the method comprising:
   receiving, by a processor of a network device implemented in digital logic circuitry, configuration data for the network device from a network management system (NMS) device separate from the network device that is managing a plurality of network devices, the configuration data specifying an expected current revision value for current configuration data deployed to the network device;
   determining, by the processor, an actual current revision value of the current configuration data for the network device;
   determining, by the processor, whether the expected current revision value is equal to the actual current revision value;
   in response to determining that the expected current revision value is equal to the actual current revision value, updating, by the processor, the current configuration data with the received configuration data; and
   after updating the current configuration data with the received configuration data:
      receiving, by the processor, instructions from the NMS device to revert to a previous version of the configuration data; and
      updating, by the processor, the current configuration data with the previous version of the configuration data.

2. The method of claim 1, wherein the expected current revision value comprises one of an expected current revision number or an expected current timestamp value, and wherein the actual current revision value comprises one of an actual current revision number or an actual current timestamp value.

3. The method of claim 1, wherein the received configuration data includes one or more additional configuration data elements relative to the current configuration data, and wherein updating the current configuration data comprises adding the additional configuration data elements to the current configuration data.

4. The method of claim 1, wherein the received configuration data includes updated configuration data elements relative to the current configuration data, and wherein updating the current configuration data comprises updating elements of the current configuration data using the updated configuration data elements.

5. The method of claim 1, wherein the received configuration data specifies configuration data elements to be deleted from the current configuration data, and wherein updating the current configuration data comprises deleting the specified configuration data elements from the current configuration data.

6. The method of claim 1, wherein determining whether the expected current revision value is equal to the actual current revision value and updating the current configuration data with the received configuration data comprises determining whether the expected current revision value is equal to the actual current revision value and updating the current configuration data with the received configuration data as an atomic operation.

7. The method of claim 1, wherein the current configuration data is stored in a configuration database of the network device, the method further comprising:
    locking the configuration database in response to receiving the configuration data; and
    unlocking the configuration database after updating the current configuration data with the received configuration data.

8. A method comprising:
    receiving, by a processor of a network management system (NMS) device implemented in digital logic circuitry, configuration data for a plurality of managed network devices separate from the NMS device;
    determining, by the processor, an expected current revision value of current configuration data deployed to the managed network devices; and
    sending, by the processor, the configuration data and the expected current revision value to the plurality of managed network devices; and
    in response to determining that the configuration data is rejected by at least one of the plurality of managed network devices, performing a roll back operation to revert the configuration data on each of the plurality of managed network devices to a previous version of the configuration data.

9. The method of claim 8, wherein determining that the configuration data is rejected comprises receiving data from the at least one of the plurality of managed network devices indicating that the configuration data is rejected by the at least one of the plurality of managed network devices.

10. A network device comprising:
    a memory storing a configuration database including current configuration data having an actual current revision value; and
    one or more processors implemented in digital logic circuitry and configured to:
        receive configuration data for the network device from a network management system (NMS) device separate from the network device that is managing a plurality of network devices, the configuration data specifying an expected current revision value for the current configuration data deployed to the network device;
        determine the actual current revision value of the current configuration data for the network device;
        determine whether the expected current revision value is equal to the actual current revision value;
        in response to determining that the expected current revision value is equal to the actual current revision value, update the current configuration data with the received configuration data;
    after updating the current configuration data with the received configuration data:
        receive instructions from the NMS device to revert to a previous version of the configuration data; and
        update the current configuration data with the previous version of the configuration data.

11. The network device of claim 10, wherein the expected current revision value comprises one of an expected current revision number or an expected current timestamp value, and wherein the actual current revision value comprises one of an actual current revision number or an actual current timestamp value.

12. The network device of claim 10, wherein the received configuration data includes one or more additional configuration data elements relative to the current configuration data, and wherein the one or more processors are configured to add the additional configuration data elements to the current configuration data.

13. The network device of claim 10, wherein the received configuration data includes updated configuration data elements relative to the current configuration data, and wherein the one or more processors are configured to update elements of the current configuration data using the updated configuration data elements.

14. The network device of claim 10, wherein the received configuration data specifies configuration data elements to be deleted from the current configuration data, and wherein the one or more processors are configured to delete the specified configuration data elements from the current configuration data.

15. The network device of claim 10, wherein the one or more processors are configured to determine whether the expected current revision value is equal to the actual current revision value and to update the current configuration data with the received configuration data as an atomic operation.

16. The network device of claim 10, wherein the one or more processors are further configured to:
    lock the configuration database in response to receiving the configuration data; and
    unlock the configuration database after either sending the error message or updating the current configuration data with the received configuration data.

17. A system comprising:
    a network management system (NMS) device; and
    a plurality of network devices separate from the NMS device, each of the network devices comprising:
        a memory storing a configuration database including current configuration data having an actual current revision value; and
        one or more processors implemented in digital logic circuitry and configured to:
            receive, from the NMS device, configuration data for the network device, the configuration data including an expected current revision value for the current configuration data deployed to the network device;
            determine the actual current revision value of the current configuration data for the network device;
            determine whether the expected current revision value is equal to the actual current revision value; and
            send an error message to the NMS device in response to determining that the expected current revision value is not equal to the actual current revision value, wherein in response to receiving the error message from at least one of the plurality of network devices, the NMS device is configured to perform a roll back operation to revert the configuration data on each of the plurality of managed network devices to a previous version of the configuration data, and wherein each of the plurality of network devices is configured to update its respective current configuration data with the previous version of the configuration data in response to the roll back operation.

* * * * *